US012735222B2

(12) United States Patent
Liu

(10) Patent No.: US 12,735,222 B2
(45) Date of Patent: Sep. 15, 2026

(54) HAND-HELD LABELING MACHINE FOR ACOUSTO-MAGNETIC (AM) ANTI-THEFT LABELS, AND AM ANTI-THEFT LABEL ROLL

(71) Applicant: NINGBO SIGNATRONIC TECHNOLOGIES, LTD., Ningbo (CN)

(72) Inventor: Caofei Liu, Ningbo (CN)

(73) Assignee: NINGBO SIGNATRONIC TECHNOLOGIES, LTD., Ningbo (CN)

( * ) Notice: Subject to any disclaimer, the term of this patent is extended or adjusted under 35 U.S.C. 154(b) by 68 days.

(21) Appl. No.: 18/840,936

(22) PCT Filed: Jun. 7, 2023

(86) PCT No.: PCT/CN2023/098862

§ 371 (c)(1),
(2) Date: Aug. 23, 2024

(87) PCT Pub. No.: WO2023/236993

PCT Pub. Date: Dec. 14, 2023

(65) Prior Publication Data

US 2025/0187777 A1 Jun. 12, 2025

(30) Foreign Application Priority Data

Jun. 10, 2022 (CN) ......................... 202210653672.7
Jun. 10, 2022 (CN) ......................... 202221458501.0

(51) Int. Cl.
*B65C 11/00* (2006.01)

(52) U.S. Cl.
CPC .......... *B65C 11/004* (2013.01); *B65C 11/006* (2013.01); *B65C 2201/00* (2013.01)

(58) Field of Classification Search
None
See application file for complete search history.

(56) References Cited

U.S. PATENT DOCUMENTS 4,440,592 A * 4/1984 Sato ...................... B65C 9/1892 156/577
5,779,852 A 7/1998 Haney et al.
2010/0051201 A1 3/2010 Sleiman

FOREIGN PATENT DOCUMENTS

CN 1232424 A 10/1999
CN 205942766 U 2/2017
EP 1679260 A1 7/2006

OTHER PUBLICATIONS

WO 9506592 machine translation (Year: 1995).*
International Search Report of PCT Patent Application No. PCT/CN2023/098862 issued on Sep. 7, 2023.

* cited by examiner

*Primary Examiner* — Barbara J Musser

(57) ABSTRACT

The present disclosure provides a hand-held labeling machine for acousto-magnetic (AM) anti-theft labels, and an AM antitheft label roll. The hand-held labeling machine includes a shell, a label feeding mechanism, a labeling mechanism, a take-up mechanism, and a limit and detection assembly, wherein the label feeding mechanism is configured to convey AM anti-theft labels; the labeling mechanism includes a label stripping head and a roller; the label stripping head is fixedly connected to the shell, and abuts against a release liner; the roller is provided above the label stripping head, and is rotatably connected to the shell; the roller abuts against the AM anti-theft label; the take-up mechanism includes a take-up spool rotatably connected to the shell and a drive assembly; and the drive assembly is configured to drive the take-up spool to rotate. The present (Continued)

disclosure can realize easy and stable labeling of the AM anti-theft labels.

9 Claims, 2 Drawing Sheets

HAND-HELD LABELING MACHINE FOR ACOUSTO-MAGNETIC (AM) ANTI-THEFT LABELS, AND AM ANTI-THEFT LABEL ROLL

TECHNICAL FIELD

The present disclosure relates to the technical field of acousto-magnetic (AM) anti-theft labels, and in particular to a hand-held labeling machine for AM anti-theft labels, and an AM anti-theft label roll.

BACKGROUND

Acousto-magnetic (AM) anti-theft labels can be repeatedly deactivated and activated. After an item attached with an AM anti-theft label is paid, a deactivator is used to deactivate the AM anti-theft label, so the item can leave the store without triggering the alarm at the store exit. AM anti-theft labels are indispensable in the retail industry, and it is of great significance to reduce the labeling cost and improve the labeling experience for the retail industry.

At present, there are two common labeling methods for the AM anti-theft labels, namely manual labeling and machine labeling. In the manual labeling method, the AM anti-theft labels are manually removed from the release liner of the label sheet (48 or 108 labels per sheet), and attached to the target items. In the machine labeling method, a bench-style or floor-standing large-scale high-speed labeling machine and a high-speed conveyor belt are matched with a high-precision large-volume label roll (7,500-10,000 labels per roll, etc.). The AM anti-theft labels are pre-attached to the packaging boxes or cards of various items, and then sent to the factories for source labeling. The manual labeling method has slow speed, and a labeler can apply only about 10-15 labels per minute through long-time continuous work. Furthermore, although the cost of the sheet labels is low, the labor cost of labeling is high. As for the machine labeling method, the labeling speed is greatly increased, and 150-550 labels can be applied per minute by the labeling machine through long-time continuous operation. However, the high-precision large-volume label roll and the high-speed labeling machine are very expensive, and the pre-attachment extends the packaging process. Besides, the high-speed labeling machine is only suitable for a single variety of identically packaged items in a large volume, and is not suitable for small and medium-sized businesses to directly label various differently-packaged items at the store level.

In addition, although there are various hand-held labeling machines for self-adhesive labels in the prior art, they are not suitable for the AM anti-theft labels. The self-adhesive labels, such as radio frequency (RF) anti-theft labels, are soft, thin, light, and have a large width-length ratio in the labeling direction (usually much greater than 0.5). In contrast, the AM anti-theft labels are hard, thick, heavy, narrow, and have a small width-length ratio in the labeling direction. When the front adhesive of the AM anti-theft label detached from the release liner is about to be attached to an intended surface, the center of gravity of the AM anti-theft label is prone to run out of the projection area (especially in the labeling direction, i.e. the width direction). As a result, the AM anti-theft label may be flipped or skewed, thereby leading to unstable labeling of the hand-held labeling machine and affecting the commercial value of the hand-held labeling machine.

To sum up, the hand-held labeling machine for self-adhesive labels in the prior art cannot realize easy and stable labeling of the AM anti-theft labels and fail to suit the needs of users.

SUMMARY

The present disclosure provides a hand-held labeling machine for acousto-magnetic (AM) anti-theft labels, and an AM anti-theft label roll. The present disclosure solves the technical problem that the hand-held labeling machine for self-adhesive labels in the prior art cannot realize easy and stable labeling of the AM anti-theft labels and fail to suit the needs of users. The present disclosure can promote the transformation of the AM anti-theft labels from manual labeling to mechanical labeling and replace sheet labels with roll labels in large quantities, thereby changing the development direction of the industry.

In order to solve the above technical problem, the present disclosure provides a hand-held labeling machine for AM anti-theft labels. The hand-held labeling machine includes a shell, and a label feeding mechanism, a labeling mechanism, a take-up mechanism and a limit and detection assembly that are arranged on the shell, where the label feeding mechanism is configured to convey AM anti-theft labels that are attached to a release liner;

the labeling mechanism includes a label stripping head and a roller; the label stripping head is fixedly connected to the shell, and abuts against the release liner; the roller is provided above the label stripping head, and is rotatably connected to the shell; and the roller abuts against the AM anti-theft label; and the take-up mechanism includes a take-up spool and a drive assembly; the take-up spool is rotatably connected to the shell; the drive assembly is configured to drive the take-up spool to rotate; an end of the release liner away from the label feeding mechanism passes through the limit and detection assembly and the label stripping head, and is fixed to the take-up spool; the limit and detection assembly is configured to detect a position of the AM anti-theft label and send a stop labeling signal to the drive assembly; and the drive assembly is configured to receive the stop labeling signal and stop driving the take-up spool to rotate.

Preferably, the limit and detection assembly may include a position detection module, a signal sending module, and a clamping portion; the clamping portion may be provided on the shell; the position detection module and the signal sending module may be respectively provided on two sides of the clamping portion; and the AM anti-theft label and the release liner may pass through the clamping portion; and the position detection module may be in communication connection with the signal sending module, and may be provided above the AM anti-theft label; the position detection module may be configured to detect the position of the AM anti-theft label and send a detection signal to the signal sending module; and the signal sending module may be configured to receive the detection signal and send the stop labeling signal to the drive assembly.

Preferably, the drive assembly may include a controller, a start switch, and a motor controlled by the controller; the controller and the motor may be arranged in the shell; an output terminal of the motor may be connected to the take-up spool; the start switch may be in communication connection with the controller, and may be configured to send a start labeling signal to the controller; and the controller may be configured to receive the start labeling signal or the stop labeling signal and control the motor to start or stop working.

Preferably, the shell may be provided thereon with a fixing frame beside the roller; and the fixing frame may be provided with a pressing plate that abuts against the AM anti-theft label.

Preferably, a limiting groove may be provided on a side of the label stripping head away from the roller; a bottom surface of the limiting groove may be parallel to a bottom surface of the shell; and an end of the release liner away from the label feeding mechanism may pass through the limit and detection assembly, the label stripping head, and the limiting groove, and may be fixed to the take-up spool.

Preferably, the label feeding mechanism may include a reel and a feed roller; the reel may be fixedly connected to the shell; the feed roller may be rotatably connected to the shell; and the release liner abuts against the feed roller.

Preferably, the reel may be provided with a clamping sleeve; and the clamping sleeve may be connected to the reel, and may have a side close to the reel abutting against the release liner.

Preferably, the label stripping head may be provided with an acute-angled stripping plate that abuts against the release liner.

Preferably, the acute-angled stripping plate may have a corner of less than 30°.

Preferably, the shell may be provided with a handle, a power switch, and an indicator light; the power switch may be configured to enable or disable a power supply connected to the drive assembly; the indicator light may be connected to the power supply; and the start switch may be provided below the handle.

The present disclosure further provides an AM anti-theft label roll, which is used for the hand-held labeling machine for AM anti-theft labels according to any one of the above paragraphs, and includes the AM anti-theft labels and the release liner, where the AM anti-theft labels are arranged on the release liner, and are spaced 0-7.0 mm apart.

Preferably, the AM anti-theft labels each may have a width of 5.0-11.0 mm along the release liner.

Preferably, a ratio of a width of each of the AM anti-theft labels along the release liner to a length thereof perpendicular to the release liner may be 0.11-0.25; and the AM anti-theft labels each may have a thickness of 1.0-2.5 mm.

Compared with the prior art, the present disclosure has the following beneficial effects:

In the hand-held labeling machine of the present disclosure, the drive assembly drives the take-up spool to rotate, thereby pulling the release liner and the AM anti-theft labels to move on the label stripping head. The rigidity of the AM anti-theft label is greater than the adhesive force between the AM anti-theft label and the release liner, so the AM anti-theft label is separated from the release liner at the corner of the label stripping head. The AM anti-theft label is automatically flattened by the roller, and there is no need to manually press the AM anti-theft label, so as to avoid contact with the AM anti-theft label, thereby ensuring the stability of the AM anti-theft label. The drive assembly makes the movement of the AM anti-theft label very smooth at the label stripping head. The limit and detection assembly controls the drive assembly to accurately stop according to the position of the AM anti-theft label. This design ensures that the front end of the AM anti-theft label is stably conveyed forward after being separated from the release liner and before being attached to the intended surface. Then the hand-held labeling machine is slightly pulled rearward, such that the AM anti-theft label is completely attached to the intended surface. In this way, the AM anti-theft label is not flipped or skewed in the whole process. In addition, the hand-held labeling machine provided by the present disclosure is light in weight, easy to hold, simple in operation, quick in labeling, and avoids the human hand touching the label.

REFERENCE NUMERALS

1. shell; 11. handle; 12. power switch; 13. indicator light; 21. reel; 22. feed roller; 23. clamping sleeve; 3. AM anti-theft label roll; 31. AM anti-theft label; 32. release liner; 41. label stripping head; 411. acute-angled stripping plate; 42. roller; 43. fixing frame; 44. pressing plate; 45. limiting groove; 51. take-up spool; 52. start switch; 6. limit and detection assembly; 61. position detection module; 62. signal sending module; 63. clamping portion; and 64. clamping plate.

DETAILED DESCRIPTION

The technical solutions of the embodiments of the present disclosure are clearly and completely described below with reference to the drawings. Apparently, the described embodiments are merely parts rather than all of the embodiments of the present disclosure. All other embodiments obtained by those of ordinary skill in the art based on the embodiments of the present disclosure without creative efforts should fall within the protection scope of the present disclosure.

Figure 1:
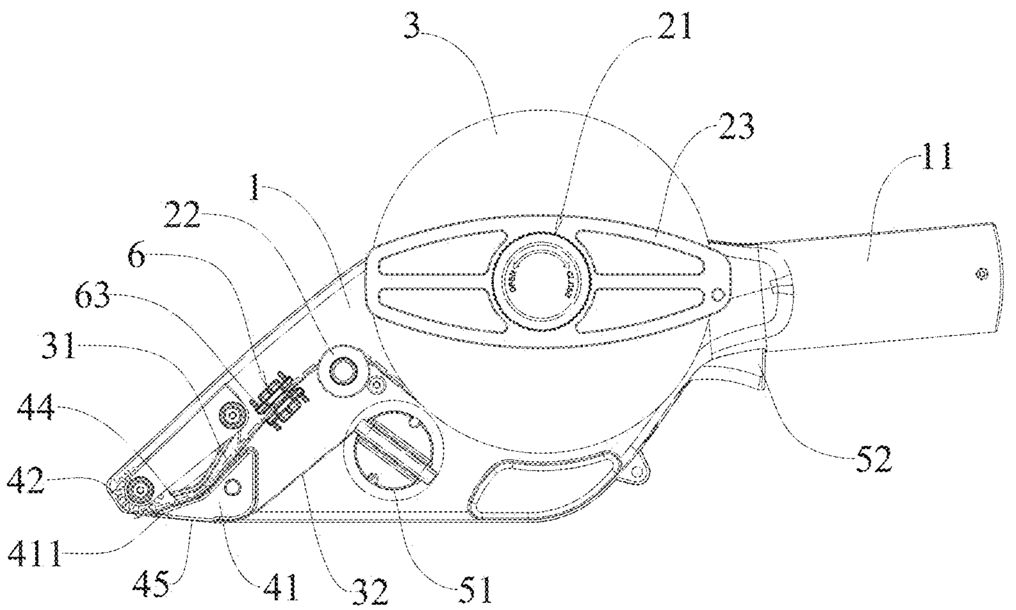
FIG. 1 is an overall structural diagram of a hand-held labeling machine for acousto-magnetic (AM) anti-theft labels according to an embodiment of the present disclosure.

Referring to FIG. 1, an embodiment of the present disclosure provides a hand-held labeling machine for acousto-magnetic (AM) anti-theft labels. The hand-held labeling machine includes a shell 1, and a label feeding mechanism, a labeling mechanism, a take-up mechanism and a limit and detection assembly 6 that are arranged on the shell 1. The label feeding mechanism is configured to convey AM anti-theft labels 31. The AM anti-theft labels 31 are attached on a release liner 32. The labeling mechanism includes a label stripping head 41 and a roller 42. the label stripping head 41 is fixedly connected to the shell 1, and the label stripping head 41 abuts against the release liner 32. The roller 42 is provided above the label stripping head 41, and the roller 42 is rotatably connected to the shell 1. The roller 42 abuts against the AM anti-theft label 31. The take-up mechanism includes a take-up spool 51 and a drive assembly (not shown in the figure). The take-up spool 51 is rotatably connected to the shell 1, and the drive assembly is configured to drive the take-up spool 51 to rotate. An end of the release liner 32 away from the label feeding mechanism passes through the limit and detection assembly 6 and the label stripping head 41, and is fixed to the take-up spool 51. The limit and detection assembly 6 is configured to detect a position of the AM anti-theft label 31 and send a stop labeling signal to the drive assembly. The drive assembly is configured to receive the stop labeling signal and stop driving the take-up spool 51 to rotate. The shell 1 is made of a plastic, a metal or a mixture of the two materials. The roller 42 may be made of rubber, which will not cause damage to the AM anti-theft label 31 flattened by the roller.

Referring to FIG. 1, the label feeding mechanism includes a reel 21 and a feed roller 22. The reel 21 is fixedly connected to the shell 1. The feed roller 22 is rotatably connected to the shell 1. The release liner 32 abuts against the feed roller 22. An inner diameter of an AM anti-theft label roll 3 is larger than a diameter of the reel 21. The AM anti-theft label roll 3 is rotatable after being provided on the reel 21. The feed roller 22 is provided between the limit and detection assembly 6 and the reel 21, and the feed roller 22 is at a higher position relative to the limit and detection assembly 6 and the label stripping head 41. The release liner 32 and the AM anti-theft labels 31 pass over the feed roller 22, which facilitates the conveyance of the release liner 32 and the AM anti-theft labels 31.

Specifically, the reel 21 is further provided with a clamping sleeve 23. The clamping sleeve 23 is connected to the reel 21. A side of the clamping sleeve 23 close to the reel 21 abuts against a side of the AM anti-theft label roll 3. The side of the clamping sleeve 23 abutting against the AM anti-theft label roll 3 can be utilized to fix the AM anti-theft label roll 3 and prevent the AM anti-theft label roll 3 from shifting during rotation. Preferably, the clamping sleeve 23 is strip-shaped, and the clamping sleeve 23 has a length greater than or equal to an outer diameter of the AM anti-theft label roll 3.

In this embodiment, the label stripping head 41 is provided with an acute-angled stripping plate 411. The release liner 32 abuts against the acute-angled stripping plate 411, and the acute-angled stripping plate 411 has a corner of less than 30°. The release liner 32 passes through the acute-angled stripping plate 411 and is fixed to the take-up spool 51. Exemplarily, the release liner 32 is adhered to the take-up spool 51. Of course, snap connection and other connection manners may also be used, which is not limited herein. Since the AM anti-theft label 31 has a rigid elastic force greater than an adhesive force between the AM anti-theft label 31 and the release liner 32, when the release liner 32 undergoes a sharp turn at the acute angle, the AM anti-theft label 31 is separated from the release liner 32, thereby realizing the label stripping. Then, the AM anti-theft label 31 is automatically flattened by the roller 42, thereby realizing labeling. In the whole process, there is no need to manually press the AM anti-theft label 31, so as to avoid contact with the AM anti-theft label 31 and ensure the stability of the AM anti-theft label 31. When the release liner 32 is continuously pulled, the AM anti-theft labels 31 are continuously dispensed, realizing continuous label feeding, stripping and labeling.

Figure 2:
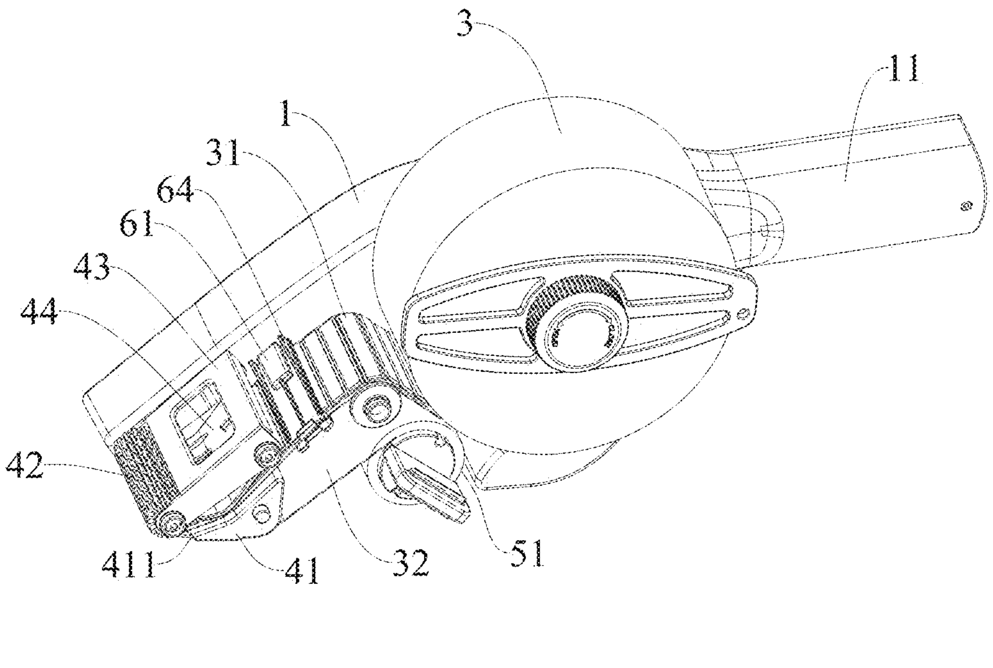
FIG. 2 is another overall structural diagram of the hand-held labeling machine for AM anti-theft labels according to an embodiment of the present disclosure.
Figure 3:
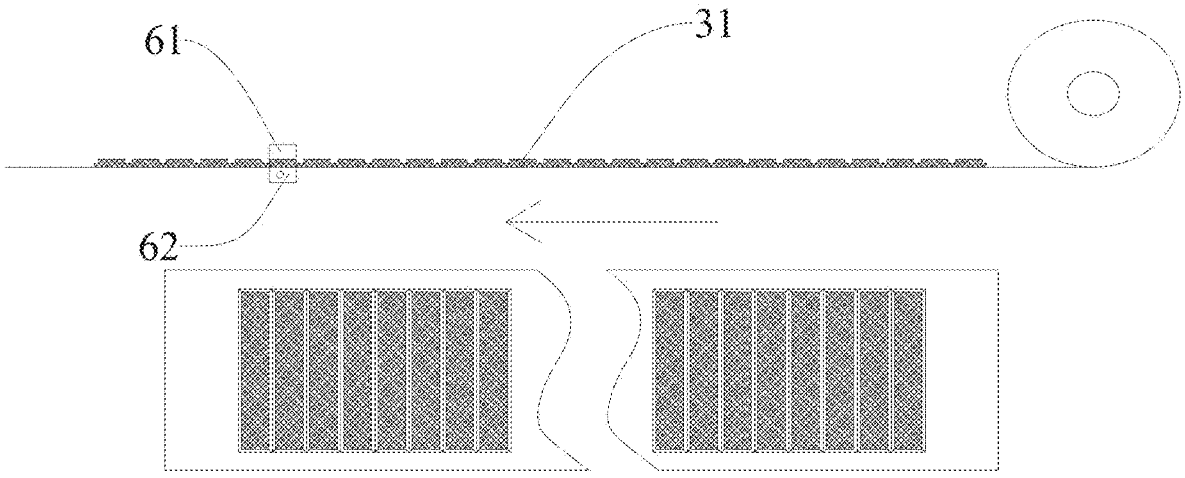
FIG. 3 is a schematic diagram illustrating detection principle of a limit and detection assembly according to an embodiment of the present disclosure.

Referring to FIG. 2 and FIG. 3, the limit and detection assembly 6 is provided between the feed roller 22 and the label stripping head 41. The limit and detection assembly 6 includes a position detection module 61, a signal sending module 62, and a clamping portion 63. The clamping portion 63 is provided on the shell 1. The position detection module 61 and the signal sending module 62 are respectively provided on two sides of the clamping portion 63. The AM anti-theft label 31 and the release liner 32 pass through the clamping portion 63. In this embodiment, the clamping portion 63 includes two clamping plates 64 that are fixed to the shell 1, and the AM anti-theft label 31 and the release liner 32 are arranged between the two clamping plates. In other embodiments, the clamping portion 63 may use magnetic suction or vacuum suction, which ensures that the AM anti-theft label 31 is detached from the release liner 32 at the label stripping head 41, and keeps the AM anti-theft label from flipping when it does not reach an intended labeling surface.

Specifically, a mounting groove is provided on an upper clamping plate 64. The position detection module 61 is fixed in the mounting groove, and the position detection module 61 is provided above the AM anti-theft label 31. The position detection module 61 is in communication connection with the signal sending module 62. The position detection module 61 is configured to detect the position of the AM anti-theft label 31 and send a detection signal to the signal sending module 62. The signal sending module 62 is configured to receive the detection signal and send the stop labeling signal to the drive assembly.

Exemplarily, the position detection module 61 is an infrared (IR) sensor or a photoelectric sensor, and the signal sending module 62 uses a receiver to receive and transmit an IR command to the drive assembly. Since the AM anti-theft label 31 has a certain thickness, an edge of the AM anti-theft label 31 protrudes from the release liner 32 after being adhered to the release liner 32. The IR sensor is able to detect the protruding edge of the AM anti-theft label 31. When the IR sensor detects a protruding edge of an AM anti-theft label 31, it indicates that a previous AM anti-theft label 31 is delivered. At this point, the receiver sends a stop labeling signal to the drive assembly. The drive assembly stops driving the take-up spool 51 to rotate, and the labeling action is completed during this process.

Specifically, the drive assembly includes a controller, a start switch 52, and a motor controlled by the controller. The controller and the motor are arranged in the shell 1. An output terminal of the motor is connected to the take-up spool 51. The start switch 52 is in communication connection with the controller, and the start switch 52 is configured to send a start labeling signal to the controller. The controller is configured to receive the start labeling signal or the stop labeling signal and control the motor to start or stop working.

When the start switch 52 is pressed, the controller receives the start labeling signal and controls the motor to start working, thereby driving the take-up spool 51 to rotate and start conveying the AM anti-theft label 31. When the position detection module 61 detects a protruding edge of an AM anti-theft label 31, it indicates that a previous AM anti-theft label 31 is delivered. At this point, the signal sending module 62 sends a stop labeling signal to the controller, and the controller receives the stop labeling signal and controls the motor to stop working. In this process, the previous AM anti-theft label 31 is conveyed to the acute-angled stripping plate 411. The AM anti-theft label 31 is separated from the release liner 32, and the AM anti-theft label 31 is automatically flattened by the roller 42, thereby completing the labeling action. It should be noted that, in this embodiment, the hand-held labeling machine completes the labeling of one AM anti-theft label 31 each time the start switch 52 is pressed. That is, after attaching one AM anti-theft label, the hand-held labeling machine stops for a while, and then sends out a next AM anti-theft label, so as to ensure the stability of the labeling. Compared with a large-scale high-speed bench-style labeling machine, the hand-held labeling machine in this embodiment is more convenient and applicable to directly labelling the packaging surfaces of items with different packages and placement directions at the stores of small and medium-sized businesses. Generally, a floor-standing or bench-style labeling machine can only label from an upper surface to a lower surface, but the hand-held labeling machine of the present disclosure can perform surface labeling at any angle. Meanwhile, the labeling speed of the hand-held labeling machine of the present disclosure is 30-100 labels per minute, which is faster than manual labeling and saves labor costs. The labeler's fingers do not need to directly contact the adhesive at the back of the AM anti-theft label 31, and the skin hurt caused by the strong adhesive is avoided.

Referring to FIG. 1, a limiting groove 45 is provided on a side of the label stripping head away from the roller 42. A bottom surface of the limiting groove 45 is parallel to a bottom surface of the shell 1. An end of the release liner 32 away from the label feeding mechanism passes through the limit and detection assembly 6, the label stripping head 41, and the limiting groove 45, and is fixed to the take-up spool 51. The release liner 32 is fixed to the take-up spool 51 after passing through the limiting groove 45, so as to ensure that the release liner 32 runs in a straight line, thereby avoiding deflection of the AM anti-theft label 31 being attached. That is, a deviation angle between the AM anti-theft labels 31 attached in a length direction and the AM anti-theft label 31 still on the release liner 32 is less than 10°.

Referring to FIG. 2, further, the shell 1 is provided with a fixing frame 43 beside the roller 42. The fixing frame 43 is provided with a pressing plate 44. The pressing plate 44 has one end fixedly connected to the fixing frame 43 and the other end abutting against the AM anti-theft label 31. When the AM anti-theft label 31 runs to the acute-angled stripping plate 411, the pressing plate 44 presses the AM anti-theft label 31 to ensure that the AM anti-theft label 31 is not flipped or skewed when it is attached, which further improves the stability of labeling. Preferably, an observation hole is provided in a center of the fixing frame 43. The end of the pressing plate 44 abutting against the AM anti-theft label 31 is provided below the observation hole, such that the pressing plate 44 and the AM anti-theft label 31 can be seen through the observation hole, which is convenient for observing the labeling state.

Figure 4:
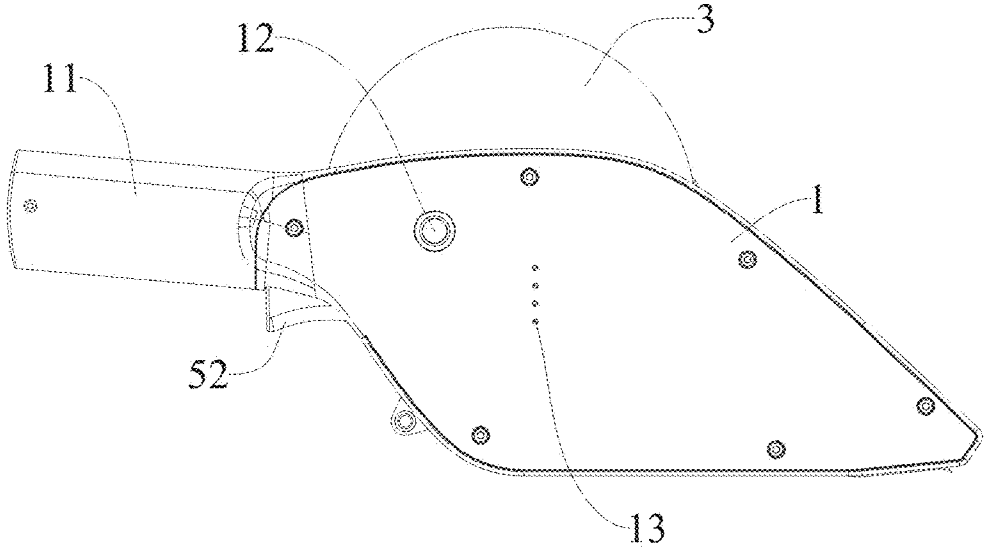
FIG. 4 is a structural diagram of a power switch and an indicator light according to an embodiment of the present disclosure.

Referring to FIG. 4, in order to facilitate the holding operation, the shell 1 is provided with a handle 11, and the start switch 52 is provided below the handle 11. Exemplarily, the start switch 52 adopts an elastic button, so it can automatically rebound while sending a start labeling signal after each pressing, so as to improve the hand feel in operation.

In this embodiment, the shell 1 is further provided with a power switch 12 and an indicator light 13. The power switch 12 is configured to enable or disable a power supply connected to the drive assembly, and the indicator light 13 is connected to the power supply. The power supply may be a battery, whose output terminal is connected to the controller, the motor, and the limit and detection assembly. The power switch 12 and the indicator light 13 are arranged on a side of the shell 1 away from the reel 21. The power switch 12 is configured to turn on or off the battery, and the indicator light 13 is configured to indicate power level and a working status of the battery.

An embodiment of the present disclosure further provides an AM anti-theft label roll, which is used for the hand-held labeling machine for AM anti-theft labels according to any one of the above embodiments. The AM anti-theft label roll 3 includes the AM anti-theft labels 31 and the release liner 32. The AM anti-theft labels 31 are arranged on the release liner 32. The AM anti-theft labels 31 are spaced 0-7.0 mm apart. Further, the AM anti-theft label 31 has a width of 5.0-11.0 mm along the release liner 32, and a ratio of the width of the AM anti-theft label 31 along the release liner 32 to a length perpendicular to the release liner is 0.11-0.25. The AM anti-theft label 31 has a thickness of 1.0-2.5 mm.

Referring to FIGS. 2 and 3, the AM anti-theft label roll 3 includes the AM anti-theft labels 31 and the release liner 32, and the AM anti-theft labels 31 are provided on the release liner 32. For example, the AM anti-theft labels 31 are attached to the transparent release liner 32 by a double-sided tape, and the AM anti-theft labels 31 have a fixed or no interval. The AM anti-theft labels 31 are regularly arranged to form the AM anti-theft label roll 3.

In a specific implementation, the outer diameter of the AM anti-theft label roll 3 is 100-300 mm. The width of the AM anti-theft label 31 is 5.0-11.0 mm, preferably 5.5 mm, 7.2 mm or 11 mm. The interval between the AM anti-theft labels 31 is 0-7.0 mm, preferably 0 mm or 4.5 mm. The thickness of the AM anti-theft label 31 is 1.0-2.5 mm, preferably 1.2 mm or 2.0 mm. The ratio of the width of the AM anti-theft label 31 along the release liner 32 to the length perpendicular to the release liner is 0.11-0.25. The length is preferably 45 mm, the width is preferably 5.5 mm, 7.2 mm or 11 mm, and the width-length ratio is preferably 0.12, 0.16 or 0.24. A net weight of a single AM anti-theft label 31 is 0.3-0.6 g. The above parameters can achieve the optimal labeling effect. Compared with the prior art, in the present disclosure, the AM anti-theft labels 31 on the AM anti-theft label roll 3 may have a certain interval, or may be directly arranged with no interval. The design of the present disclosure greatly saves the cost of the roll labels, thereby greatly increasing the number of labels attached to the AM anti-theft label roll 3 under the same outer diameter.

It should be noted that the prior art does not involve a hand-held labeling machine capable of applying the AM anti-theft labels. Most of the AM anti-theft labels are manually labeled, and the vast majority of the tens of billions of AM anti-theft labels in the world is still sheet labels rather than roll labels. Since there are various hand-held labeling machines for attaching self-adhesive labels (such as RF anti-theft labels) on the market, almost all of the tens of billions of RF anti-theft labels applied every year are roll labels. Therefore, the present disclosure solves the technical problem and pain point of the industry that the hand-held labeling machine cannot realize convenient and stable labeling of AM anti-theft labels in the prior art. The present disclosure can promote the transformation from the manual labeling of the AM anti-theft labels to mechanical labeling and replace large quantities of AM anti-theft sheet labels with the AM anti-theft roll labels, thereby changing the development direction of the industry.

Overall, in the presently disclosed hand-held labeling machine, the controller and the motor drive the take-up spool 51 to rotate, so as to pull the release liner 32 and the AM anti-theft labels 31 to move on the label stripping head 41. The rigidity of the AM anti-theft label 31 is greater than the adhesive force between the AM anti-theft label and the release liner 32, so the AM anti-theft label 31 is separated from the release liner 32 at the corner of the label stripping head 41. The AM anti-theft label 31 is automatically flattened by the roller 42, and there is no need to manually press the AM anti-theft label 31, so as to avoid contact with the AM anti-theft label 31, thereby ensuring the stability of the AM anti-theft label 31. When the position detection module 61 detects a protruding edge of an AM anti-theft label 31, it indicates that a previous AM anti-theft label 31 is delivered. At this point, the signal sending module 62 sends a stop labeling signal to the controller, and the controller receives the stop labeling signal and controls the motor to stop working. The motor drives the take-up spool 51 to rotate such that the movement of the AM anti-theft label 31 is relatively smooth at the label stripping head 41. The limit and detection assembly 6 controls the drive assembly to stop according to the position of the AM anti-theft label 31. This design ensures that the AM anti-theft label 31 is stably conveyed forward after being separated from the release liner 32 and before being attached to the intended surface. In this way, the AM anti-theft label 31 is not flipped or skewed during the whole process. In addition, the hand-held labeling machine provided by the present disclosure is light in weight, easy to hold, and simple in operation.

The objectives, technical solutions, and beneficial effects of the present disclosure are further described in detail through the above specific examples. It should be understood that the above are merely some specific examples of the present disclosure, but are not intended to limit the protection scope of the present disclosure. It should be particularly noted that, any modifications, equivalent substitutions, and improvements made by those skilled in the art within the spirit and principle of the present disclosure, for example, any hand-held labeling machine that can be used to attach AM anti-theft roll labels and any AM anti-theft label roll, should be included within the protection scope of the present disclosure.

The invention claimed is:

1. A hand-held labeling machine for acousto-magnetic (AM) anti-theft labels, comprising a shell, and a label feeding mechanism, a labeling mechanism, a take-up mechanism and a limit and detection assembly that are arranged on the shell, wherein the label feeding mechanism is configured to convey AM anti-theft labels that are attached to a release liner;

the labeling mechanism comprises a label stripping head and a roller; the label stripping head is fixedly connected to the shell, and abuts against the release liner; the roller is provided above the label stripping head, and is rotatably connected to the shell; and the roller abuts against the AM anti-theft label;

the take-up mechanism comprises a take-up spool and a drive assembly; the take-up spool is rotatably connected to the shell; the drive assembly is configured to drive the take-up spool to rotate; an end of the release liner away from the label feeding mechanism passes through the limit and detection assembly and the label stripping head, and is fixed to the take-up spool; the limit and detection assembly is configured to detect a position of the AM anti-theft label and send a stop labeling signal to the drive assembly; and the drive assembly is configured to receive the stop labeling signal and stop driving the take-up spool to rotate, wherein the limit and detection assembly comprises a position detection module, a signal sending module, and a clamping portion; the clamping portion is provided on the shell; the position detection module and the signal sending module are respectively provided on two sides of the clamping portion; and the AM anti-theft label and the release liner pass through the clamping portion; and the position detection module is in communication connection with the signal sending module, and is provided above the AM anti-theft label; the position detection module is configured to detect the position of the AM anti-theft label and send a detection signal to the signal sending module; and the signal sending module is configured to receive the detection signal and send the stop labeling signal to the drive assembly.

2. The hand-held labeling machine for AM anti-theft labels according to claim 1, wherein the drive assembly comprises a controller, a start switch, and a motor controlled by the controller; the controller and the motor are arranged in the shell; an output terminal of the motor is connected to the take-up spool; the start switch is in communication connection with the controller, and is configured to send a start labeling signal to the controller; and the controller is configured to receive the start labeling signal or the stop labeling signal and control the motor to start or stop working.

3. The hand-held labeling machine for AM anti-theft labels according to claim 1, wherein the shell is provided thereon with a fixing frame beside the roller; and the fixing frame is provided with a pressing plate that abuts against the AM anti-theft label.

4. The hand-held labeling machine for AM anti-theft labels according to claim 1, wherein a limiting groove is provided in a side of the label stripping head away from the roller; a bottom surface of the limiting groove is parallel to a bottom surface of the shell; and an end of the release liner away from the label feeding mechanism passes through the limit and detection assembly, the label stripping head, and the limiting groove, and is fixed to the take-up spool.

5. The hand-held labeling machine for AM anti-theft labels according to claim 1, wherein the label feeding mechanism comprises a reel and a feed roller; the reel is fixedly connected to the shell; the feed roller is rotatably connected to the shell; and the release liner abuts against the feed roller.

6. The hand-held labeling machine for AM anti-theft labels according to claim 5, wherein the reel is provided with a clamping sleeve; and the clamping sleeve is connected to the reel, and has a side close to the reel abutting against the release liner.

7. The hand-held labeling machine for AM anti-theft labels according to claim 1, wherein the label stripping head is provided with an acute-angled stripping plate that abuts against the release liner.

8. The hand-held labeling machine for AM anti-theft labels according to claim 7, wherein the acute-angled stripping plate has a corner of less than 30°.

9. The hand-held labeling machine for AM anti-theft labels according to claim 2, wherein the shell is provided with a handle, a power switch, and an indicator light; the power switch is configured to enable or disable a power supply connected to the drive assembly; the indicator light is connected to the power supply; and the start switch is provided below the handle.

* * * * *